(12) United States Patent
Tzeng et al.

(10) Patent No.: US 9,817,493 B2
(45) Date of Patent: Nov. 14, 2017

(54) CLICKPAD AND INFORMATION HANDLING SYSTEM INCLUDING SAME

(71) Applicant: Dell Products L.P., Round Rock, TX (US)

(72) Inventors: Chun-Kai Tzeng, KeeLung (TW); Chin-Chung Wu, New Taipei (TW); Te-Sen Chin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 14/728,395

(22) Filed: Jun. 2, 2015

(65) Prior Publication Data

US 2016/0357277 A1    Dec. 8, 2016

(51) Int. Cl.
*G06F 3/0354*    (2013.01)
*G06F 1/16*    (2006.01)

(52) U.S. Cl.
CPC .......... *G06F 3/03547* (2013.01); *G06F 1/169* (2013.01); *G06F 2203/04105* (2013.01)

(58) Field of Classification Search
None
See application file for complete search history.

(56) References Cited

U.S. PATENT DOCUMENTS

2010/0134964 A1\* 6/2010 Smith ................. B60R 11/0252
361/679.2

\* cited by examiner

*Primary Examiner* — Gustavo Polo
(74) *Attorney, Agent, or Firm* — Jackson Walker L.L.P.

(57) ABSTRACT

In accordance with embodiments of the present disclosure, a method may include mechanically supporting a cantilever arm of a clickpad between a support bracket and a housing by a compressive force of the plurality of fasteners applied to the support bracket and the housing, and free of any features for receiving any of a plurality of fasteners for coupling the support bracket to the housing, wherein the cantilever arm has a pivot end and a trigger end, and such that the cantilever arm pivots about a pivot axis proximate to the pivot end in response to a force exerted on the surface of the clickpad substantially perpendicular to a surface of the clickpad.

20 Claims, 3 Drawing Sheets

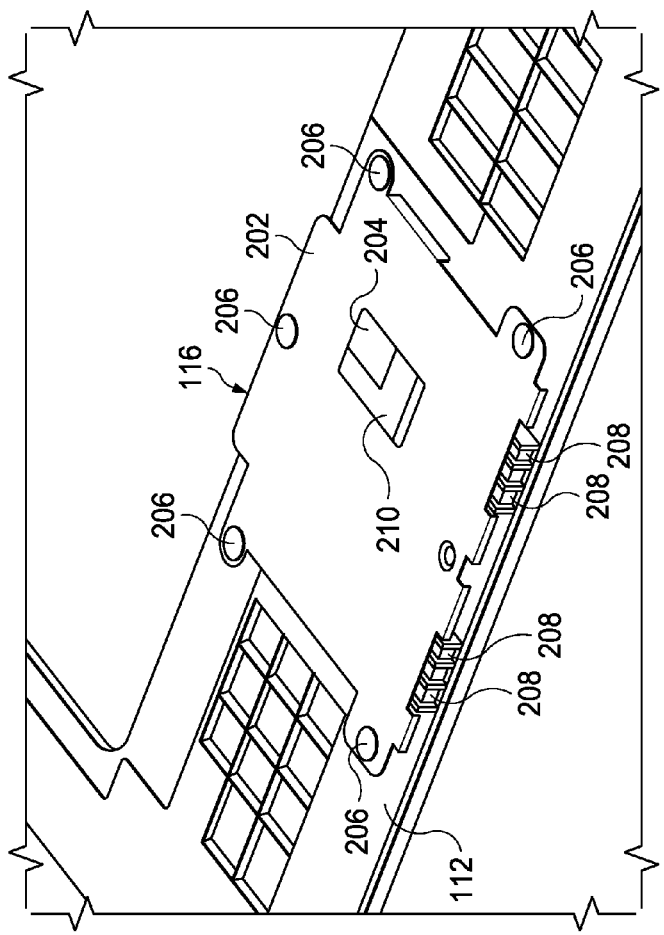
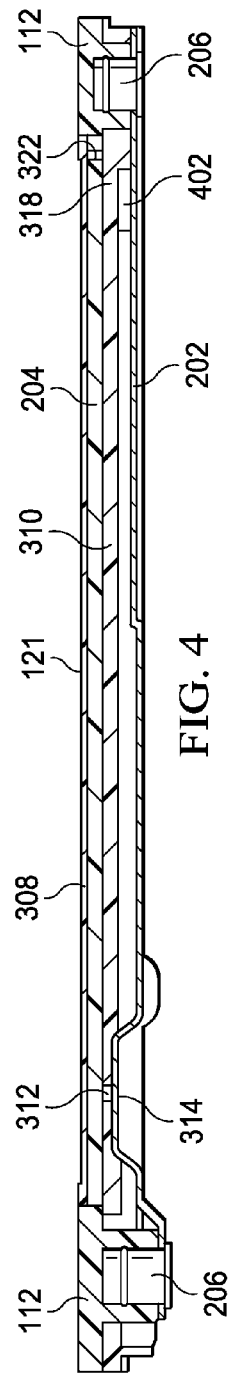

CLICKPAD AND INFORMATION HANDLING SYSTEM INCLUDING SAME

TECHNICAL FIELD

The present disclosure relates in general to information handling systems, and more particularly to a clickpad for use in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems utilize a clickpad, which combines the functionality of a pointing device (e.g., a touchpad or trackpad) with the functionality of a push button. The pointing device may include a tactile sensor that may translate motion and position of a user's fingers (or other pointing device, such as a stylus) to a relative position on a display device of an information handling system. A clickpad may also associate the movement of pushing downward on the surface of the clickpad as the same as a push of a button (e.g., the input operation of a click of a mouse button).

Many existing clickpad implementations may suffer from disadvantages and problems. For example, existing approaches do not provide a desirable tactile feeling to users when users attempt to perform a button click by pushing downward on the surface of the clickpad. This tactile feeling is also negatively affected in existing approaches when a user handles notebook information handling systems from one side, due to mechanical stresses placed on the clickpad when a notebook information handling system is so held.

SUMMARY

In accordance with the teachings of the present disclosure, the disadvantages and problems associated with clickpads have been reduced or eliminated.

In accordance with embodiments of the present disclosure, an information handling system may include a housing and a clickpad at least partially housed within the housing. The clickpad may include a support bracket, a cantilever arm, and a circuit board. The support bracket may be mechanically coupled to the housing via a plurality of fasteners and may comprise an emboss. The cantilever arm may have a pivot end and a trigger end and may be mechanically supported at the pivot end between the support bracket and the housing by a compressive force of the plurality of fasteners applied to the support bracket and the housing, and free of any features for receiving any of the plurality of fasteners, and wherein the cantilever arm may be configured to pivot about a pivot axis proximate to the pivot end in response to a force exerted on the surface of the clickpad substantially perpendicular to a surface of the clickpad. The circuit board may be mechanically supported by the cantilever arm and may comprise a touch sensor configured to detect tactile events on the clickpad and a pad proximate to the trigger end and configured to physically contact the emboss in response to the force exerted on the surface of the clickpad and generate an electrical signal indicative of such contact.

In accordance with these and other embodiments of the present disclosure, a clickpad may include a support bracket, a cantilever arm, and a circuit board. The support bracket may be configured to mechanically couple to a housing of an information handling system by a plurality of fasteners and the support arm may comprise an emboss. The cantilever arm may have a pivot end and a trigger end and may be configured to be mechanically supported at the pivot end between the support bracket and the housing by a compressive force of the plurality of fasteners applied to the support bracket and the housing, and free of any features for receiving any of the plurality of fasteners, the cantilever arm may also be configured to pivot about a pivot axis proximate to the pivot end in response to a force exerted on the surface of the clickpad substantially perpendicular to a surface of the clickpad. The circuit board may be mechanically supported by the cantilever arm and may include a touch sensor configured to detect tactile events on the clickpad and a pad proximate to the trigger end and configured to physically contact the emboss in response to the force exerted on the surface of the clickpad and generate an electrical signal indicative of such contact.

In accordance with these and other embodiments of the present disclosure, a method may include mechanically coupling a support bracket having an emboss to a housing of an information handling system by a plurality of fasteners. The method may also include mechanically supporting a cantilever arm between the support bracket and the housing by a compressive force of the plurality of fasteners applied to the support bracket and the housing, and free of any features for receiving any of the plurality of fasteners, wherein the cantilever arm has a pivot end and a trigger end, and such that the cantilever arm pivots about a pivot axis proximate to the pivot end in response to a force exerted on the surface of the clickpad substantially perpendicular to a surface of the clickpad. The method may further include mechanically supporting a circuit board by the cantilever arm, wherein the circuit board comprises a touch sensor configured to detect tactile events on the clickpad and a pad proximate to the trigger end and configured to physically contact the emboss in response to the force exerted on the surface of the clickpad and generate an electrical signal indicative of such contact.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a "bottom-up" perspective view of a portion of a first housing of the example information handling system depicted in FIG. 1 with a lower wall removed and with a clickpad mechanically coupled to an upper wall, in accordance with certain embodiments of the present disclosure;

FIG. 4 illustrates a cross-sectional elevation view of a clickpad, taken along the line 4-4 shown in FIG. 1, in accordance with certain embodiments of the present disclosure.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
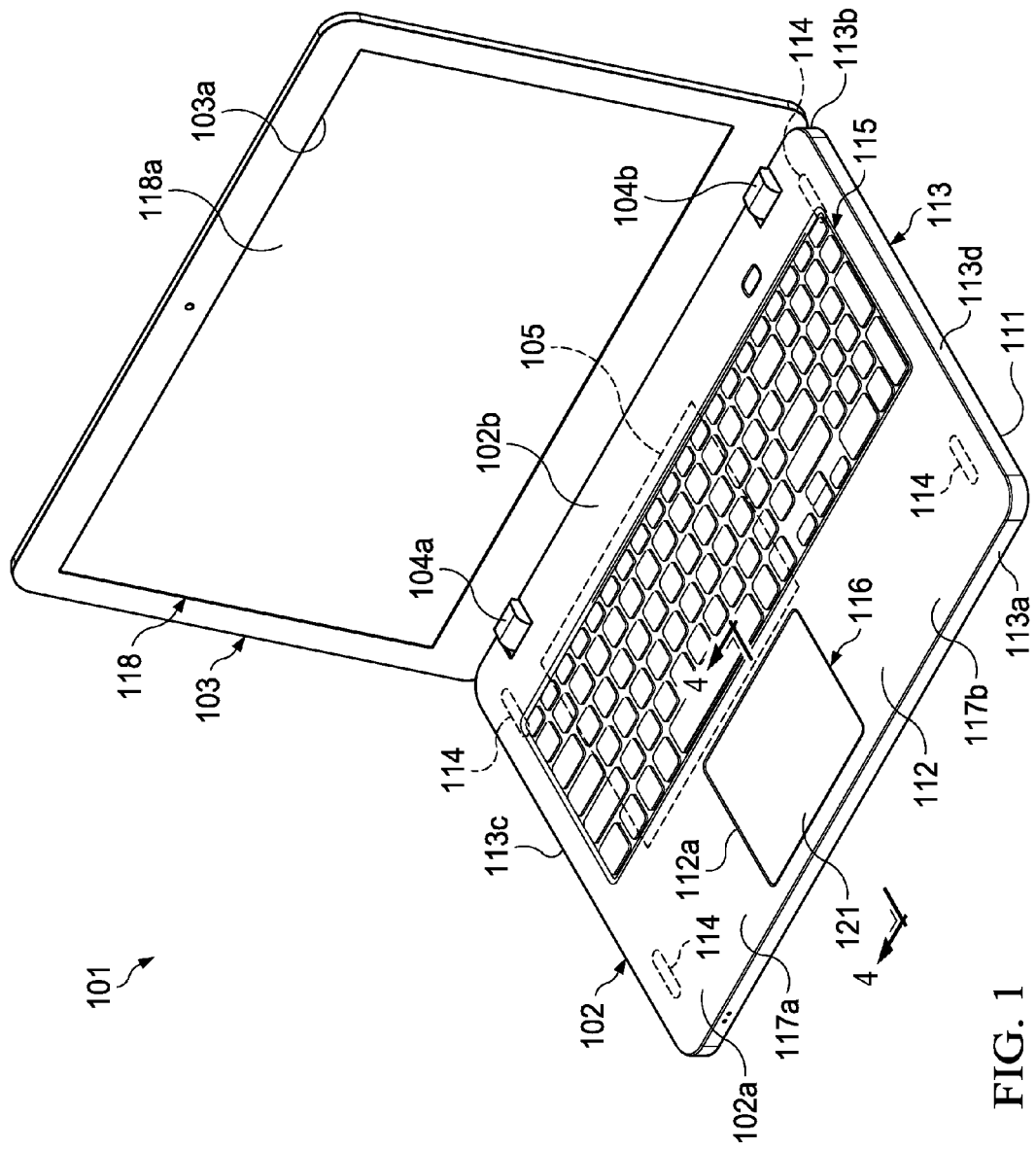
FIG. 1 illustrates a perspective view of an example information handling system, in accordance with certain embodiments of the present disclosure.

FIG. 1 illustrates a perspective view of an example information handling system 101, in accordance with certain embodiments of the present disclosure. As depicted in FIG. 1, information handling system 101 may comprise a notebook or "laptop" computer. In other embodiments, information handling system 101 may comprise a mobile device sized and shaped to be readily transported and carried on a person of a user of information handling system 101 (e.g., a smart phone, a tablet computing device, a handheld computing device, a personal digital assistant, etc.). As illustrated in FIG. 1, information handling system 101 may comprise a first housing 102, a second housing 103 and hinges 104a and 104b. First housing 102 may comprise, for example, a main body housing. Accordingly, in some embodiments, a circuit board 105 and other information handling resources may be housed within first housing 102. Circuit board 105 may include one or more information handling resources, including without limitation, one or more processors, one or more memories, and/or one or more peripheral devices.

First housing 102 may include a lower wall 111 (i.e., a bottom wall or a first wall), an upper wall 112 (i.e., a second wall) and a peripheral wall 113 (i.e., a third wall), and thus may be formed in the shape of a flat box. Lower wall 111 may be opposite to a desktop surface (i.e., a placement surface or an external placement surface), e.g., when information handling system 101 is placed on a desk or table. Lower wall 111 may include, e.g., a plurality of supporting portions 114 (e.g., legs, feet, casters, etc.). Leg portions 114 may contact with a desktop, tabletop, or other surface to support information handling system 101, when information handling system 101 is placed on a desk, table, or other surface.

Upper wall 112 may be located opposite to lower wall 111. Upper wall 112 may be substantially parallel to lower wall 111. For example, a keyboard 115 and a click pad unit 116 may be provided on upper wall 112. Upper wall 112 may include an opening 112a from which clickpad 116 may be exposed to a user. Keyboard 115 and clickpad 116 may each comprise input devices for receiving input from a user to allow the user to control operation of information handling system 101. In some embodiments, information handling system 101 may comprise a touch panel (e.g., a touch sensor) or other input devices in addition to or instead of keyboard 115 and/or clickpad 116.

Peripheral wall 113 may be located in a direction crossing lower wall 111 and upper wall 112, and thus may couple a peripheral portion of lower wall 111 to a peripheral portion of upper wall 112. Peripheral wall 113 may include a front wall 113a, a back wall 113b, a first side wall 113c (e.g., a left wall) and a second side wall 113d (e.g., a right wall).

First housing 102 may include a first end 102a and a second end 102b. First end 102a may comprise a front end. Second end 102b may be located opposite to first end 102a. Second end 102b may comprise a back end. Hinges 104a and 104b may be coupled to second end 102b. In this disclosure, a component or a portion of a component closer from a user's viewpoint is defined as "front" while a component or a portion of a component further from a user's viewpoint is defined as "back" based on the position of the electronic apparatus put on a desktop, tabletop, or other surface. Also, "right," "left," "top," "bottom," "up," "down," "upward," and "downward" are defined from the user's viewpoint.

Front wall 113a may be located at first end 102a of first housing 102, and may extend in a longitudinal direction (i.e., a width direction) of first housing 102. Back wall 113b may be located opposite to front wall 113a, and may extend substantially in parallel with front wall 113a. First side wall 113c and second side wall 113d may extend in a direction crossing front wall 113a and back wall 113b (e.g., substantially perpendicularly), and couple front wall 113a to back wall 113b.

As illustrated in FIG. 1, clickpad 116 may be located between front wall 113a and keyboard 115. First housing 102 may include palm rests 117a and 117b between clickpad 116 and first side wall 113c, and between clickpad 116 and second side wall 113d.

As illustrated in FIG. 1, second housing 103 may include a display housing and may comprise a display 118 (e.g., a display device or a display module). Display 118 may comprise a display screen 118a which may be exposed via an opening 103a formed on a front wall of second housing 103.

Hinges 104a and 104b may rotatably couple second end 102b of first housing 102 to an end of second housing 103. Thus, information handling system 101 may be openable and closable (i.e., foldable). In other words, information handling system 101 may be transformable between a first state in which first housing 102 and second housing 103 overlap each other, and a second state in which first housing 102 and second housing 103 are opened and keyboard 115, clickpad 116 and display screen 118a are exposed to the outside.

As shown in FIG. 1, clickpad 116 may include a clickpad surface (e.g., an operation surface or an input surface) 121. Clickpad 116 may comprise a flat-shaped input device having the function of both a pointing device and a push button. That is, clickpad 116 may associate a movement of a finger, stylus, or other pointing device tracing the surface of clickpad 116 with the movement of a mouse pointer on display screen 118a, and may associate a movement of pushing clickpad surface 121 of clickpad 116 as the same input operation as a click of a mouse. Thus, clickpad surface 121 may be exposed to the outside of housing 102 (e.g., the outside of information handling system 101), and a user may operate clickpad 116 for input by tracing clickpad surface 121 (e.g., by a finger, stylus, or other pointing device) and/or pressing downward on clickpad surface 121 (e.g., with a force having a substantial component in a direction perpendicular to clickpad surface 121).

The information handling system to which a clickpad 116 as described herein can be applied is not limited to the above example of a notebook information handling system having two hinged housings, and may be broadly applied to various types of electronic apparatuses such as a tablet terminal, a television, a cellular phone (including a smart phone), a game console, and/or other information handling systems that include a single housing.

Figure 3:
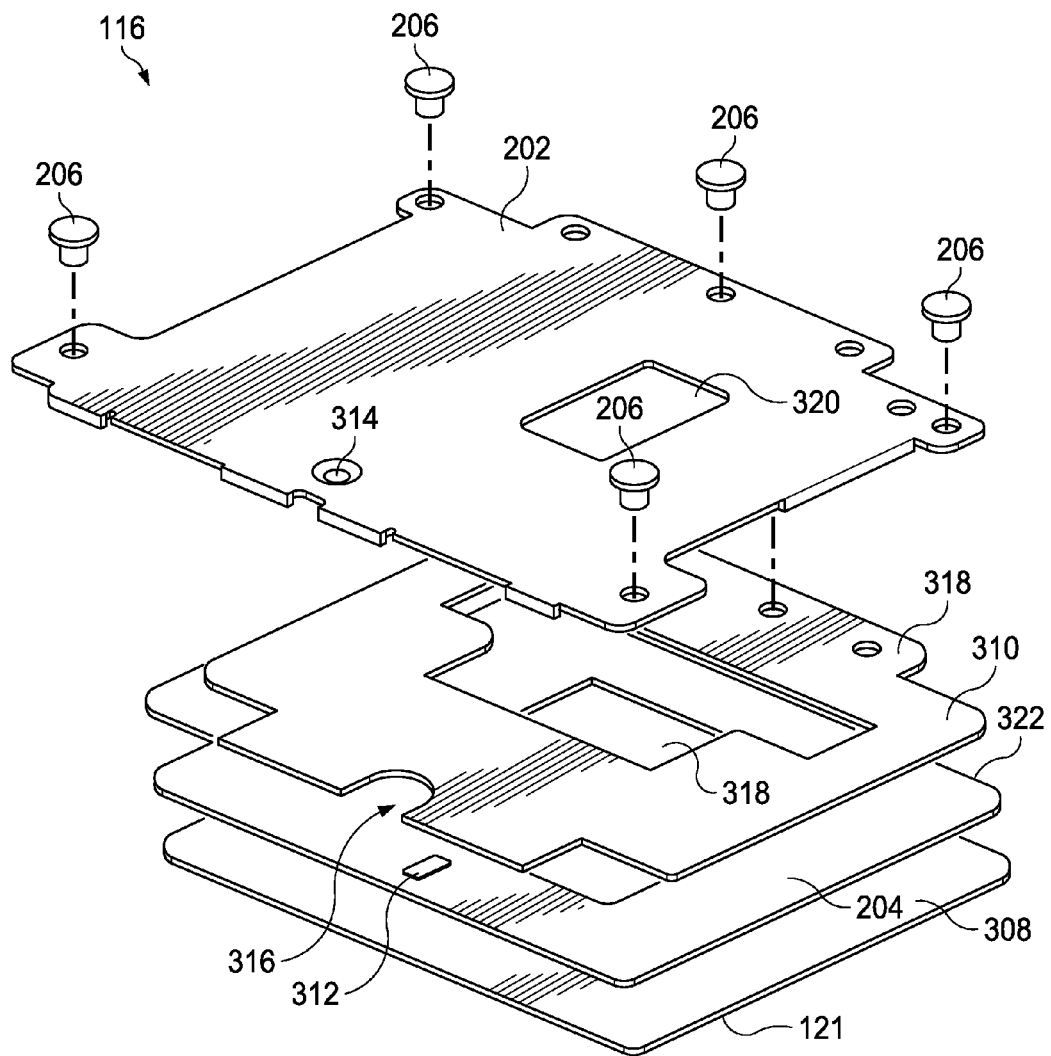
FIG. 3 illustrates an exploded "bottom-up" perspective view of an example clickpad, in accordance with certain embodiments of the present disclosure.

Selected components of clickpad 116 are described in greater detail with respect to FIGS. 2-4 below. FIG. 2 illustrates a "bottom-up" perspective view of a portion of first housing 102 with lower wall 111 removed and with clickpad 116 mechanically coupled to upper wall 112, in accordance with certain embodiments of the present disclosure. FIG. 3 illustrates an exploded "bottom-up" perspective view of clickpad 116, in accordance with certain embodiments of the present disclosure. FIG. 4 illustrates a cross-sectional elevation view of clickpad 116, taken along the line 4-4 shown in FIG. 1, in accordance with certain embodiments of the present disclosure.

As shown in FIGS. 2-4, clickpad 116 may comprise a support bracket 202, a cantilever arm 310, a circuit board 204, a cover 308, and a plurality of fasteners 206. As shown in FIGS. 2-4, cover 308 may include at least a portion of clickpad surface 121, and thus a first surface (e.g., top surface) of cover 308 may face externally to housing 102 (e.g., via opening 112a). Examples of materials that may be used for cover 308 include, without limitation, a polyester film (e.g., biaxially-oriented polyethylene terephthalate, commonly known by its trade name MYLAR), or any other suitable material through which a touch on clickpad surface 121 may be sensed by a touch sensor present on circuit board 204.

A second surface (e.g., bottom surface) of cover 308 may be opposite from a first surface (e.g., top surface) of circuit board 204. Circuit board 204 may include a printed circuit board (PCB), printed wiring board (PWB), printed wiring assembly (PWA), etched wiring board, and/or any other board or similar physical structure operable to mechanically support and electrically couple electronic components (e.g., packaged integrated circuits, slot connectors, etc.). Circuit board 204 may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board. In some embodiments, circuit board 204 may comprise a flexible circuit board. In clickpad 116, circuit board 204 may include a touch sensor on its first surface (e.g., top surface). As known in the art, a touch sensor may include any system, device, or apparatus configured to detect tactile touches (e.g., by a human finger, a stylus, etc.) on the touch sensor and generate one or more signals indicative of the occurrence of such touches and/or the locations of such touches on the touch sensor. In some embodiments, a touch sensor may include a capacitive touch sensor configured to detect changes in capacitance induced by tactile touches. In some embodiments, such signals may be communicated to a connector 210 on a second surface (e.g., bottom surface) of circuit board 204, such that signals indicative of the occurrence of such touches and/or the locations of such touches on the touch sensor may be communicated (e.g., via a cable or other electronic conduit) to circuit board 204 or another information handling resource of information handling system 101.

As shown in FIGS. 3 and 4, circuit board 204 may include a pad 312. Pad 312 may comprise an electrically conductive pad that may generate an electrical signal indicative of whether pad 312 is in physical contact with emboss 314 of support bracket 202. Physical contact between pad 312 and emboss 314 may indicate that a user has pressed downward on clickpad 116, thus indicating the user's desire to click on clickpad 116. The electrical signal generated by pad 312 may be communicated to connector 210, such that the electrical signal indicative of a clickpad button push may be communicated (e.g., via a cable or other electronic conduit) to circuit board 204 or another information handling resource of information handling system 101.

The second surface (e.g., bottom surface) of circuit board 204 may be opposite from a first surface (e.g., top surface) of cantilever arm 310. Examples of materials that may be used for cantilever arm 310 include, without limitation, a plastic. As shown in FIGS. 3 and 4, cantilever arm 310 may comprise a pivot end (e.g., back end) and a trigger end (e.g., front end). As described in greater detail below, clickpad 116 may be constructed such that as downward pressure is placed on clickpad 116, cantilever arm 310 may deflect about a pivot axis 402 at pivot end 318. As shown in FIG. 4, the pivot axis 402 may be located near a back end 322 of circuit board 204, such that the pivot axis 402 is within a footprint of circuit board 204. In some embodiments, such pivot axis 402 may be within a footprint of opening 112a of upper wall 112 of first housing 102. As shown in FIG. 3, cantilever arm 310 may include an opening 316 or other feature allowing pad 312 to come into contact with emboss 314 when clickpad 116 is pressed in the downward direction. As also shown in FIG. 3, cantilever arm 310 may include an opening 318 through which a cable or other electrical conduit may pass in order to couple to connector 210.

A second surface (e.g., bottom surface) of cantilever arm 310 may be opposite from a first surface (e.g., top surface) of support bracket 202. Examples of materials that may be used for support bracket 202 include, without limitation, aluminum, steel, and/or other metals. As shown in FIGS. 2-4, support bracket 202 may be mechanically coupled to upper wall 112 via a plurality of fasteners (e.g., screws) 206 via corresponding openings in support bracket 202 and upper wall 112. In addition, support bracket 202 may further be supported by one or more flanges 208 protruding from upper wall 112 which may limit movement of support bracket 202 in a downward direction but not a left-to-right or back-to-front direction.

Notably, none of fasteners 206 are used to mount cover 308, circuit board 204, or cantilever arm 310 to any other structure (although one or more of cover 308, circuit board 204, and cantilever arm 310 may be coupled to one another via fasteners and/or adhesives). Instead, cover 308, circuit board 204, and cantilever arm 310 may be held in place at the back end of clickpad 116 proximate to pivot axis 402 entirely by friction and the compressive force placed on such components by the fasteners 206 coupling support bracket 202 to upper wall 112.

Thus, pivot axis 402 of cantilever arm 310 is a free-end pivot, as opposed to a fixed-end pivot which is present in many existing clickpad implementations. Accordingly, as so constructed, the placement of pivot axis 402, as well as it being a free-end pivot, may reduce the likelihood of contact by a user with the back end of clickpad 116 being received as a button click and may distribute force required to induce contact between pad 312 and emboss 314 over the active touch sensor area of clickpad 116, each of which may increase positive user experience over existing implementations.

As shown in FIGS. 3 and 4, support bracket 202 may include an emboss 314. Such emboss 314 may be formed such that when downward force is exerted on clickpad 116, emboss 314 partially deflects so as to create a spring force resisting such downward force, allowing cantilever arm 310 return to its original position when such downward force is removed. As so constructed, support bracket 202 may not only provide an actuation point (e.g., via emboss 314) for pad 312, but may also form a rigid structure in the clickpad area of first housing 102 that may resist the impact to a user's tactile feel of clickpad 116 that may arise in existing approaches in which a user handles an information handling system from one of its sides, thus causing mechanical stress upon the clickpad.

As also shown in FIG. 3, support bracket 202 may include an opening 320 through which a cable or other electrical conduit may pass in order to couple to connector 210.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a housing; and
   a clickpad at least partially housed within the housing, the clickpad comprising:
      a support bracket mechanically coupled to the housing via a plurality of fasteners and having an emboss;
      a cantilever arm having a pivot end and a trigger end and mechanically supported at the pivot end between the support bracket and the housing by a compressive force of the plurality of fasteners applied to the support bracket and the housing, and free of any features for receiving any of the plurality of fasteners, the cantilever arm configured to pivot about a pivot axis proximate to the pivot end in response to a force exerted on the surface of the clickpad substantially perpendicular to a surface of the clickpad; and
      a circuit board mechanically supported by the cantilever arm and comprising:
         a touch sensor configured to detect tactile events on the clickpad; and
         a pad proximate to the trigger end and configured to physically contact the emboss in response to the force exerted on the surface of the clickpad and generate an electrical signal indicative of such contact.

2. The information handling system of claim 1, the clickpad further comprising a cover covering the touch sensor.

3. The information handling system of claim 2, wherein the cover comprises a polyester film.

4. The information handling system of claim 1, wherein the cantilever arm comprises a plastic.

5. The information handling system of claim 1, wherein the support bracket comprises a metal.

6. The information handling system of claim 1, the pivot axis comprising a free-end pivot.

7. The information handling system of claim 1, the housing further comprising at least one flange configured to support the support bracket.

8. A clickpad comprising:
- a support bracket configured to mechanically couple to a housing of an information handling system by a plurality of fasteners and having an emboss;
- a cantilever arm having a pivot end and a trigger end and configured to be mechanically supported at the pivot end between the support bracket and the housing by a compressive force of the plurality of fasteners applied to the support bracket and the housing, and free of any features for receiving any of the plurality of fasteners, the cantilever arm configured to pivot about a pivot axis proximate to the pivot end in response to a force exerted on the surface of the clickpad substantially perpendicular to a surface of the clickpad; and
- a circuit board mechanically supported by the cantilever arm and comprising:
    - a touch sensor configured to detect tactile events on the clickpad; and
    - a pad proximate to the trigger end and configured to physically contact the emboss in response to the force exerted on the surface of the clickpad and generate an electrical signal indicative of such contact.

9. The clickpad of claim 8, further comprising a cover covering the touch sensor.

10. The clickpad of claim 9, wherein the cover comprises a polyester film.

11. The clickpad of claim 8, wherein the cantilever arm comprises a plastic.

12. The clickpad of claim 8, wherein the support bracket comprises a metal.

13. The clickpad of claim 8, the pivot axis comprising a free-end pivot.

14. A method comprising:
- mechanically coupling a support bracket having an emboss to a housing of an information handling system by a plurality of fasteners;
- mechanically supporting a cantilever arm between the support bracket and the housing by a compressive force of the plurality of fasteners applied to the support bracket and the housing, and free of any features for receiving any of the plurality of fasteners, wherein the cantilever arm has a pivot end and a trigger end, and such that the cantilever arm pivots about a pivot axis proximate to the pivot end in response to a force exerted on the surface of the clickpad substantially perpendicular to a surface of the clickpad; and
- mechanically supporting a circuit board by the cantilever arm, wherein the circuit board comprises:
    - a touch sensor configured to detect tactile events on the clickpad; and
    - a pad proximate to the trigger end and configured to physically contact the emboss in response to the force exerted on the surface of the clickpad and generate an electrical signal indicative of such contact.

15. The method of claim 14, further comprising covering the touch sensor with a cover.

16. The method of claim 15, wherein the cover comprises a polyester film.

17. The method of claim 14, wherein the cantilever arm comprises a plastic.

18. The method of claim 14, wherein the support bracket comprises a metal.

19. The method of claim 14, comprising supporting the cantilever arm such that the pivot axis comprises a free-end pivot.

20. The method of claim 14, further comprising supporting the support bracket by at least one flange of the housing.

* * * * *